United States Patent
Lee et al.

(10) Patent No.: US 6,379,524 B1
(45) Date of Patent: Apr. 30, 2002

(54) METHOD FOR PREPARING COMPOSITE MEMBRANE FOR SEPARATION OF HYDROGEN GAS

(75) Inventors: Kew Ho Lee; Seung Eun Nam; Sang Hak Lee, all of Daejeon (KR)

(73) Assignee: Korea Research Institute of Chemical Technology (KR)

(*) Notice: Subject to any disclaimer, the term of this patent is extended or adjusted under 35 U.S.C. 154(b) by 0 days.

(21) Appl. No.: 09/582,309
(22) PCT Filed: Dec. 24, 1998
(86) PCT No.: PCT/KR98/00461
§ 371 Date: Jun. 23, 2000
§ 102(e) Date: Jun. 23, 2000
(87) PCT Pub. No.: WO99/33545
PCT Pub. Date: Jul. 8, 1999

(30) Foreign Application Priority Data

Dec. 24, 1997 (KR) ............................................. 97/73505

(51) Int. Cl.$^7$ .............................. C25D 3/56; C25D 5/54; C25D 5/10; C25D 7/00
(52) U.S. Cl. ..................... 205/255; 205/257; 205/259; 205/162; 205/182; 205/209; 205/150
(58) Field of Search ................................ 205/255, 257, 205/162, 205, 209, 182, 150, 259

(56) References Cited

U.S. PATENT DOCUMENTS

| | | | |
|---|---|---|---|
| 2,773,561 A | 12/1956 | Hunter | 183/115 |
| 5,318,688 A | * 6/1994 | Najjar et al. | 205/150 |

FOREIGN PATENT DOCUMENTS

| | | | |
|---|---|---|---|
| EP | 0570185 A2 | * 11/1993 | |
| EP | 0629434 A1 | * 12/1994 | |
| WO | WO-89/04556 A1 | * 5/1989 | |
| WO | WO-94/01872 A1 | * 1/1994 | |
| WO | WO-96/40413 A1 | * 12/1996 | |
| WO | WO-97/40914 A1 | * 11/1997 | |

OTHER PUBLICATIONS

Uemiya et al., "A Palladium/Porous–Glass Composite Membrane for Hydrogen Separation", Chem. Lett., pp. 1687–1690, (no month available) 1988.*

Yan et al., "Thin Palladium Membrane Formed in Support Pores by Metal–Organic Chemical Vapor Deposition Method and Application to Hydrogen Separation", Ind. Eng. Chem. Res., vol. 33, pp. 616–622, (no month available) 1994.*

Uemiya et al., "Hydrogen Permeable Palladium–Silver Alloy Membrane Supported On Porous Ceramics", J. of Membrane Sci., vol. 56, pp. 315–325, (no month available) 1991.*

Collins et al., "Preparation and Characterization of a Composite Palladium–Ceramic Membrane", Ind. Eng. Chem. Res., vol. 32, pp. 3006–3013, (no month available) 1993.*

Shu et al., "Simultaneous Deposition of Pd and Ag Porous Stainless Steel by Electroless Plating", J. of Membrane Sci., vol. 77, pp. 181–195, (no month available) 1993.*

Xomeritakis et al., "Fabrication of a Thin Palladium Membrane Supported in a Porous Ceramic Substrate by Chemical Vapor Deposition", J. of Membrane Sci., pp 261–272, (no month available) 1996.*

Athayde et al., "Metal Composite Membranes for Hydrogen Separation", J. of Membrane Sci., vol. 94, pp. 299–311, (no month available) 1994.*

Jayaraman et al., "Synthesis and Hydrogen Permeation Properties of Ultrathin Palladium–Silver Alloy Membranes", J. of Membrane Sci., vol. 104, pp. 251–262, (no month available) 1995.*

Chem. Lett., 10, 1687 (1988), No Month Available.
Ind. Eng. Chem. Res., 33, 616(1994), No Month Available.
J. Membr. Sci., 56, 315 (1991), No Month Available.
J. Membr. Sci., 77, 181 (1993), No Month Available.
Ind. Eng. Chem. Res., 32, 3006 (1993), No Month Available.
J. Membr. Sci., 120, 261(1996), No Month Available.
J. Membr. Sci., 94, 299 (1994), No Month Available.
J. Membr Sci., 104, 251(1995), No Month Available.
Study on Electroplating of Palladium–Nickel Alloy from Ethylenediamine Bath (II. Study by Galvanostatic Pulse Electroplating), Matsunaga et al., pp. 987–989 vol. 43, No. 10, 1992, No Available Month.

* cited by examiner

*Primary Examiner*—Edna Wong
(74) *Attorney, Agent, or Firm*—Finnegan, Henderson, Farabow, Garrett & Dunner, L.L.P.

(57) ABSTRACT

A process for manufacturing a composite membrane for separation of hydrogen gas using palladium, which employs the step of electroplating under vacuum an alloy of a palladium compound and a transition metal.

9 Claims, No Drawings

METHOD FOR PREPARING COMPOSITE MEMBRANE FOR SEPARATION OF HYDROGEN GAS

BACKGROUND OF THE INVENTION

1. Field of the Invention

The present invention relates to a method for preparing a composite membrane for separation of hydrogen gas and more particularly, to a method for preparing the composite membrane with better permeation and separation coefficient on hydrogen gas, prepared in such a manner that an alloy consisting of a palladium complex compound and transition metal is electroplated on a modified porous support under vacuum, thereby forming the thin plated-layer without pinholes.

2. Description of the Related Art

Generally, it is advantageous to use a material with larger permeation and separation coefficients as a membrane for separation of a hydrogen gas. When the hydrogen gas is separated by a membrane derived from an organic polymer, the membrane manifests some poor physical properties such as its thermal stability, chemical resistance and durability. In particular, the selectivity of a membrane to a certain gas tends to be lowered as its gas permeability becomes larger, and thus a highly purified hydrogen cannot be obtained.

Meanwhile, a palladium-based separation membrane has a higher solubility and diffusion property to the hydrogen gas so that the selective separation of hydrogen gas may be available through its dense surface. In this context, some metals such as palladium have been mainly used so as to obtain a highly purified hydrogen from a mixing gas containing hydrogen.

However, the use of pure palladium membrane for the hydrogen separation is restricted, as hydrogen embrittlement caused by the transition between the α- and β-phase occurs in membranes in contact with hydrogen at temperature below 300° C. and pressure below 2 HPA. Since the lattice constant of the β-phase is at least 3% larger than that of the α-phase, the nucleation and growth of the β-phase cause strains in the metal and thereby the embrittlement of the material.

To comply with this matter, a method of using an alloy containing palladium and other metals has been suggested instead of use of pure palladium; With its proper prevention of any hydrogen saturation and interaction between a metal plated in the form of substitution and hydrogen atom, a palladium-alloy membrane may serve to prevent the regular arrangement of hydrogen atoms within the lattice and thus, any formation of a beta phase does not occur. The palladium-alloy membrane may further enhance the selectivity to hydrogen gas and durability, compared with a separation membrane derived from pure palladium. In particular, in order to improve the performance of membrane, a method of coating palladium thinly on a porous support has been under consideration and some studies on such composite-type separation membrane has been mainly conducted.

As disclosed in U.S. Pat. No. 2,773,561, the use of pure palladium or palladium-based alloy membrane with some metal in the absence of the composite-type separation membrane has some disadvantages in that a) this method is uneconomical due to an excess use of palladium in a membrane, and b) since the thickness of membrane should be in the range of 25–150 μm to endure the temperature and pressure, its larger thickness may lower the permeation rate.

In this respect, it is recommended that a palladium composite membrane containing a thin palladium alloy membrane on its support, be employed as a separation membrane for hydrogen gas instead of palladium metal membrane or thin palladium alloy membrane.

Examples of the existing materials used for a support of a palladium composite membrane includes glass (Chem. Lett., 10, 1687(1988)), inorganic materials such as porous ceramics (Ind. Eng. Chem. Res., 33, 616(1994)); J. Memb. Sci., 56,315(1991)) and stainless steel (J. Memb. Sci., 181 (1993)). Whereas the weak strength of the glass and porous ceramics are susceptible to easy destruction and the sealing between a separation membrane and permeation cell may not be made available, a porous support derived from a stainless steel has several advantages such as a) lower material cost, b) little occurrence of corrosion and crack, c) easier processing, and d) higher mechanical strength for modulation.

In addition, examples of the plating methods designed to prepare a palladium composite membrane by means of coating palladium metal membrane and palladium alloy membrane on a porous support includes a) electroless plating (J. Memb. Sci., 77, 181(1993); Ind. Eng. Chem. Res., 32,3006(1993)), b) chemical vapor deposition (Ind. Eng. chem. Res. 33, 616(1994); J. Memb. Sci., 120,261(1996)) and c) sputtering (J. Memb. Sci., 94,299(1994): J. Memb. Sci. 104,251(1995)).

The electroless plating method comprising a variety of multi-pretreatment steps and several repeated activation steps at the surface of support has several disadvantages in that a) more prolonged treatment time is required, b) the thickness of film may be controllable due to continuous plate growth, and c) the excellent capacity of membrane may be hardly expected, since a membrane with a thickness of 10–20 μm should be prepared to form a pinhole-free layer.

The chemical deposition (CVD) method has also been used to coat thin films of thickness below 5 μm. Although the CVD method could prepare highly selective films, it required too high purity of constituents and strict conditions in view of an economical aspect. Also, since the CVD method cannot form an alloy, the method forms β-phase which induces hydrogen embrittlement.

The sputtering method has little separation effect of hydrogen gas via a palladium layer due to difficulty in forming defect-free film.

SUMMARY OF THE INVENTION

Therefore, an object of this invention is to provide a method for preparing a composite membrane for separation of hydrogen gas with improved permeability and separation capability to hydrogen gas, wherein a palladium alloy compound is electroplated on a porous support; instead of using palladium, a palladium complex compound is applied so as to lessen the difference of standard electropotential between palladium and transition metal used as alloy metal; the surface of porous support is modified to form a homogeneous, thin and pinhole-free layer; in particular, during electrodeposition, the thickness of an electrodeposited layer, so formed in the presence of vacuum, is thinly adjusted to further enhance the permeation and selectivity of hydrogen gas from a mixing gas containing hydrogen.

DETAILED DESCRIPTION OF THE INVENTION

This invention is characterized by a method for preparing composite membrane for separation of hydrogen gas using palladium, wherein an alloy containing palladium and transition metal is electroplated on a porous support.

This invention is explained in more detail as set forth hereunder.

This invention relates to a method for preparing a composite membrane where a palladium alloy complex is the form of homogenous and thin membrane is located, without any pin-hole formation, at one surface of porous support having possibly homogeneous micropores, to the extent that the diffusion of gas may not be affected. To this end, some major characteristics of this invention are that;

a palladium complex compound is used;

the surface of support is modified to thinly adjust an alloy layer without any pin-hole formation;

an electroplating method under vacuum state is applied.

According to this invention, an electroplating method is applied so as to form a palladium alloy membrane on the porous support. Under the conventional method, this method is not only simply and easy to adjust a thickness of the composite membrane, but also economical in that less time is required than the electroless plating and chemical vapor deposition.

In case of applying a general electroplating method designed to form a palladium alloy membrane, the amount of palladium from the composition of alloy is not easily adjusted due to big difference of standard electropotential between palladium and transition metal. For example, the standard electropotential of palladium and nickel used as a transition metal is 0.987V and −0.250V, respectively, and a difference of standard electropotential between both is 1.237V. In this regard, when a direct current is given, the plating amount of palladium is larger than a transition metal due to more rapid plating rate of the former and thus, an alloy with a desired chemical composition cannot be prepared.

To overcome such shortcomings associated with the application of electroplating method, this invention has introduced a method of electroplating an alloy derived from a palladium complex compound and transition metal on a porous support; more specifically, the whole molecules present in the support are electrically neutralized to lower a difference of standard electropotential, thus being easy to adjust a composition of alloy, using the palladium complex compound.

According to this invention, the method for preparing a composite membrane for separation of hydrogen gas is explained in more detail as follows:

The first step is to prepare a palladium complex compound. In case of the complex compound using palladium and ligand, it is preferred to select the ligand which is strongly coordinate with palladium in aqueous solution and which does not form any other complex compound. The typical examples of ligand include ethylene diamine, diethylene diamine, tetraammonia and diammonia; among them, it is more preferred to select ethylene diamine. The manufacturing process of the palladium complex compound is based on the existing method (Hydem Gijutsu, M. Matsunaga, M. Hara, A. Ablimit, Y. Tsura and K. Hosokawa, 43(10), 987(1992)).

The second step is to prepare an alloy using the palladium complex compound, so formed above and transition metals.

The examples of the transition metal include VIII group elements such as Pt, Rh, Ir, Fe, Co and Ni; IB group elements such as Cu, Ag and Au; VIA group elements such as Cr, Mo and W; IVA group elements such as Ti and Zr; and VA group element such as Ta, Nb and V. It is preferred to select VIII group elements, more preferably Ni.

Also, it is preferred that to rapidly facilitate the alloy between the palladium complex compound and transition metal, the transition metal is in the form of ion compound.

Further, it is preferred that the amount of palladium is in the ratio of more than 50% by weight to the total weight of the alloy and more preferably, the ratio of the palladium to the transition metal is in the range of 50:50–90:10 wt %.

The process for manufacturing the composite membrane designed to electroplate palladium alloy on a porous support is as follows:

In order to manufacture a homogeneous membrane without pin-holes based on the conventionally available electroplating method, the thickness of an electroplated layer should be more than 5 $\mu$m but such range of thickness may induce a poor permeability of membrane. Under such circumstances, an electroplated layer with more thinly adjusted thickness may improve the permeability coefficient of hydrogen gas.

According to this invention, the vaccumization at the opposite side of the electroplated layer during electroplating may deeply prevent the pores present at the surface of support, while reducing the thickness of the electroplated layer. The thickness of the electroplated layer may vary differently depending on the intensity of vaccumization. In this context, it is preferred that the vacuumization is carried out in the range of 500–650 torr.

The composite membrane manufactured by the above electroplating process of this invention exhibits significantly excellent permeation property to hydrogen gas as well as better permeability and selectivity, compared with the conventional membrane using the common electroplating method.

Examples of some porous support materials according to this invention may include conductive metals such as stainless steel including ceramic or glass coated with a conductive material; hence, it is preferred to use a porous support derived from conductive metals and any of porous support having a flat or tube membrane may be employed. However, when a palladium alloy is directly electroplated on the surface of such porous support, the membrane structure may be inadequate to separation of hydrogen gas due to the relative thickness of the electroplated layer and presence of pin-holes. Thus, the surface of the support should be modified, while readjusting the pore size.

Generally, the average pore size of the porous support used for separation of gas is in the range of 0.01–1 $\mu$m; in this case, the separation of gas is controlled by the Knudsen diffusion which is in inverse to the square root of molecular weight of permeating gas molecules and hence, the selectivity of hydrogen to nitrogen gas is about 3.7.

According to this invention, some conductive transition metals such as nickel are used to modify the surface of a porous support. In addition, some other conductive materials with a same effect may be used; for example, fine powders of conductive carbon are coated in the surface of the support. When the surface is coated with fine nickel powders, the separation coefficient of hydrogen and nitrogen is measured about 2.0–2.7. This reflects that the surface is somewhat modified but relatively large pores still exist on the surface of support. Meanwhile, when the surface coated with fine granules of nickel is copper plated, the separation coefficient of hydrogen and nitrogen is measured at about 3.5–3.7, and this reflects that the adhesive powder between a support and electroplated layer is improved, while the pore size of support becomes smaller. Thus, a palladium alloy is electroplated on a porous support to obtain an electroplated layer in the form of a thin membrane without pin-holes.

One embodiment of this invention designed to electroplate a palladium alloy on a stainless steel support by an electroplating method using a vacuum, is explained in more detail.

The surface of the stainless steel support, having a pore size of 0.2–0.5 μm, is coated with fine nickel powders less than 1 μm in size and heated at 700–850° C. for 4–6 hours; hence, the coating amount of nickel powders is in the range of 0.003–0.01 g per unit area.

Then, the surface of the support is washed with distilled water to remove some dust and impurities and treated with a sulfuric acid solution for activation of the surface. The surface is copper-plated in the range of 200–1,000 m+e,cir +hd +ee for about 3–30 minutes using a bath containing diluted copper cyanide.

The support, so modified from the above procedure, is fixed to a plating plate cell, immersed in a palladium alloy bath and electroplated, while reducing the pressure at the opposite side of electroplate by less than 650 torr.

In order to assess the performance of the composite membrane for separation of hydrogen gas, so manufactured from the above-mentioned manufacturing method, the permeability was measured by a gas-permeability apparatus at normal state; the adhesion between the composite membrane and permeation cell was performed by a graphite ring; temperature was adjusted by an electric furnace at an outer cell. With such equipment, the composite membrane, which is thinly coated with a palladium alloy compound and transition metal on its support, may be used as a selective membrane for separation of hydrogen gas; hence, the higher temperature is, the larger permeation rate of hydrogen gas becomes and the higher pressure difference of hydrogen gas between the membrane, the larger permeation rate of hydrogen gas also becomes.

The following specific examples are intended to be illustrative of the invention and should not be construed as limiting the scope of the invention as defined by the appended claims.

Manufacturing Example
Preparation of a Plating Solution Derived from Palladium Alloy Ethylene diamine was added to 5 g of palladium; bichloride dissolved in 200 ml of distilled water in the molar ratio of 2.2, stirred the mixture and filtered off the non reactants, while passing the vapor. Then, 35% hydrochloric acid was added to the filtered solution in the molar ratio of 2.2, stirred the mixture for about 30 minutes and cooled at 4° C. for 24 hours for storage. Thereafter, a palladium complex compound, so precipitated, was filtered off and dried by a vacuum dryer. Hence, the remaining ethylene diamine was separated via a reaction of ethylene diamine with hydrochloric acid to form an ammonium salt, while the palladium complex compound was precipitated in the form of palladium ethylene diamine bichloride.

A mixture containing 0 g of nickel sulfate (NISO4-6H2O), so prepared from the reaction of nickel with sulfuric acid and 5 g of palladium ethylene diamine bichloride, so precipitated from the above process, was dissolved in 300 ml of distilled water and with the addition of amidosulfuric acid, the pH of the resulting solution was adjusted at 7.7 to prepare a plating solution. According to the chemical composition of palladium alloy, the weight percent ratio of palladium and nickel was 70:30.

EXAMPLE 1

A stainless steel support was washed with distilled water and NaOH for removal of impurities and then, its surface was activated through treatment with 5% solution of sulfuric acid. The support was immersed in a plating bath containing 0.084M CuCN and 0.2M NaCN to modify the support having the surface plated with copper at 1 A for 60–90 minutes. The support, so modified, was fixed in a plating cell, immersed in a bath containing the palladium-alloy plate prepared by the manufacturing example, and electroplated at 35 mA for 2 hours.

The composite membrane, so prepared, was homogeneously plated, and hydrogen gas was selectively flowed through the membrane.

EXAMPLE 2

Fine nickel powders with the size of less that 1 μm were dispersed on the surface of a stainless steel support and heated at 800° C. for 5 hours. The stainless steel support was washed with distilled water and NaOH for removal of impurities and then, its surface was activated through treatment with 5% solution of sulfuric acid. The support was immersed in a plating bath containing 0.084M CuCN and 0.2M NaCN to modify the support having the surface plated with copper at 1 A for 60–90 minutes. The support, so modified, was fixed in a plating cell, immersed in a bath containing the palladium-alloy plate prepared by the manufacturing example, and electroplated at 35 mA for 2 hours.

The composite membrane, so prepared, was homogeneously plated and extremely stable to any heat. The permeability of the composite to hydrogen and nitrogen gas was shown in the following table.

EXAMPLE 3

Fine nickel powders with the size of less than 1 μm were dispersed on the surface of a stainless steel support and heated at 800° C. for 5 hours. The stainless steel support was washed with distilled water and NaOH for removal of impurities and then, its surface was activated through treatment with 5% solution of sulfuric acid. The support was immersed in a plating bath containing 0.084M CuCN and 0.2M NaCN to modify the support having the surface plated with copper at 1 A for 20 minutes. The support, so modified, was fixed in a plating cell, immersed in a bath containing the palladium-alloy plate prepared by the manufacturing example, and electroplated at 40 mA for 50 minutes under vacuum at 660 torr at the opposite of a plated side.

EXAMPLE 4

The composite membrane for separation of hydrogen gas was prepared in the same manner as Example 3, except that the electroplating was conducted at 1 A for 3 minutes under vacuum at 660 torr at the opposite of a plated layer.

EXAMPLE 5

Fine nickel powders with the size of less than 1 μm were dispersed on the surface of a stainless steel support and heated at 800° C. for 5 hours. The stainless steel support was washed with distilled water and NaOH for removal of impurities and then, its surface was activated through treatment with 5% solution of sulfuric acid. The support was immersed in a plating bath containing 0.084M CuCN and 0.2M NaCN to modify the support having the surface plated with copper and 40 mA for 20 minutes. The support, so modified, was fixed in a plating cell and immersed in a bath containing the palladium-alloy plate prepared by the manufacturing example for electroplate. In consideration of the fact that with the lapse of time, the pores of the support became smaller, the support was electroplated at 40 mA for 50 minutes in such a manner that the initial vacuumization was maintained at 660 torr and then reduced at 75 torr each at the intervals of 10 minutes.

The permeability of the composite membrane, so prepared, to hydrogen and nitrogen gas was measured, as shown in Table 1.

EXAMPLE 6

The composite membrane for separation of hydrogen gas was prepared in the same manner as Example 5, except that the copper plating time was determined as 15 minutes, the vacuumization was less reduced by about 125 torr at the intervals of 10 minutes, and the electroplate time was determined as 40 minutes.

The permeation rate of the composite membrane, so prepared, was 90–100 $cm^3/cm^2$-cm Hg-s at 550° C and pressure difference of 82.7 kPa and this permeation rate is ten times as high as composite membrane using palladium. The results of permeability of the composite to hydrogen and nitrogen gas were shown in the following table 1.

Comparative Example 1

Based on a composite membrane manufactured by the method of electroless plating, it properties such as permeability, thickness of the plate and other reaction conditions were shown in the following table 1.

Comparative Example 2

Based on a composite membrane manufactured by the method of sputtering, its properties such as permeability, thickness of the plate and other reaction conditions were shown in the following table 1.

Comparative Example 3

Based on a composite membrane manufactured by the method of chemical vapor deposition, its properties such as permeability, thickness of the plate and other reaction conditions were shown in the following table 1.

Comparative Example 4

Based on a Pd/Ag composite membrane with a thickness of 25.4 μm, the permeability of the membrane was measured at 100 psi of pressure difference at both sides of membrane was shown in the following table 1.

TABLE 1

| | Permeability ($cm^3/cm^2$ - cm Hg - s) | Selectivity ($H_2/N_2$) | Thickness of plated-layer (μm) | Pressure used (kPa) | Temperature used (K) |
|---|---|---|---|---|---|
| Example 2 | $7.60 \times 10^{-4}$ | 118.2 | 7 | 70 | 723 |
| Example 5 | $7.90 \times 10^{-3}$ | 572 | 4 | 82.7 | 823 |
| Example 6 | $2.62 \times 10^{-2}$ | 1845 | 3 | 82.7 | 823 |
| Comparative Example 1 | $2.94 \times 10^{-3}$ | 650 | 37214 | 1500 | 823 |
| Comparative example 2 | $4.40 \times 10^{-5}$ | 5.7 | 0.25–0.5 | 200 | 523 |
| Comparative example 3 | $4.12 \times 10-3$ | 1000 | 2 | 100–200 | 773 |
| Comparative example 4 | $2.36 \times 10^{-3}$ | — | 25.4 | 700 | 723 |

As shown in the above table 1, it was noted that the composite membrane of this invention had better selectively for hydrogen-nitrogen than some membranes using the conventional method, and this was quite evident in that some membranes based on the. conventional method adopted a higher pressure condition to enhance the permeability. In particular, when the palladium alloy electroplate was conducted under vacuum (Examples 5 and 6), the membrane of this invention exhibited better properties than that of the conventional electroplating methods (Example 2, Comparative examples 1–4).

As mentioned above, it is well understood that the composite membrane prepared according to this invention is effective for selective separation of hydrogen gas.

What is claimed is:

1. A process for manufacturing a composite membrane for separation of hydrogen gas using palladium, comprising the step of electroplating under vacuum, an alloy consisting of a palladium compound and transition metal on a porous support.

2. The process for manufacturing a composite membrane for separation of hydrogen gas according to claim 1, wherein a palladium complex compound employed during said electroplating is a complex of palladium and a ligand, wherein the ligand is selected from an ethylene diamine, diethylene diamine, tetraammonia, or diammonia ligand.

3. The process for manufacturing a composite membrane for separation of hydrogen gas according to claim 1, wherein the amount of the palladium compound in said alloy is more than 50% by weight.

4. The process for manufacturing a composite membrane for separation of hydrogen gas according to claim 1, wherein said transition metal is selected from the group consisting of VIII, IB, VIA, IVA and VA group elements.

5. The process for manufacturing a composite membrane for separation of hydrogen gas according to claim 1, wherein the electroplating under vacuum is conducted on the porous support having a pore size of 0.01–1 mm.

6. The process for manufacturing a composite membrane for separation of hydrogen gas according to claim 5 wherein one of the support sides is pretreated before deposition by dispersing submicron-sized metal powder on the surface followed by heating.

7. The process for manufacturing a composite membrane for separation of hydrogen gas according to claim 1, wherein said porous support is derived from conductive metals, ceramic, ceramic coated with conductive material, or glass coated with conductive material.

8. The process for manufacturing a composite membrane for separation of hydrogen gas according to claim 1, wherein the surface of said porous support is modified by a copper plating.

9. The process for manufacturing a composite membrane for separation of hydrogen gas according to claim 1, wherein said porous support is a flat or tube membrane.

* * * * *